US009710177B1

(12) United States Patent
Natanzon

(10) Patent No.: US 9,710,177 B1
(45) Date of Patent: Jul. 18, 2017

(54) CREATING AND MAINTAINING CLONES IN CONTINUOUS DATA PROTECTION

(71) Applicant: EMC Corporation, Hopkinton, MA (US)

(72) Inventor: Assaf Natanzon, Tel Aviv (IL)

(73) Assignee: EMC IP Holdings Company LLC, Hopkinton, MA (US)

(*) Notice: Subject to any disclaimer, the term of this patent is extended or adjusted under 35 U.S.C. 154(b) by 0 days.

(21) Appl. No.: 14/661,636

(22) Filed: Mar. 18, 2015

Related U.S. Application Data

(63) Continuation of application No. 13/337,678, filed on Dec. 27, 2011, now Pat. No. 8,996,827.

(51) Int. Cl.
*G06F 12/00* (2006.01)
*G06F 3/06* (2006.01)
*G06F 11/14* (2006.01)
*G06F 11/16* (2006.01)
*G06F 11/20* (2006.01)

(52) U.S. Cl.
CPC ............ *G06F 3/0619* (2013.01); *G06F 3/065* (2013.01); *G06F 3/067* (2013.01); *G06F 3/0647* (2013.01); *G06F 3/0665* (2013.01); *G06F 3/0689* (2013.01); *G06F 11/1446* (2013.01); *G06F 11/1461* (2013.01); *G06F 11/1469* (2013.01); *G06F 11/1662* (2013.01); *G06F 11/2058* (2013.01)

(58) Field of Classification Search
CPC .... G06F 3/067; G06F 3/0647; G06F 2201/84; G06F 11/2074; G06F 11/2058; G06F 11/1461; G06F 11/1469; G06F 11/2056; G06F 11/1446; G06F 11/1662
See application file for complete search history.

(56) References Cited

U.S. PATENT DOCUMENTS

| 6,981,114 | B1* | 12/2005 | Wu ..................... G06F 11/1469 711/112 |
| 2005/0055523 | A1* | 3/2005 | Suishu ................ G06F 11/2058 711/165 |
| 2012/0278553 | A1* | 11/2012 | Mudhiganti et al. ......... 711/114 |

* cited by examiner

*Primary Examiner* — Shawn X Gu
(74) *Attorney, Agent, or Firm* — Krishnendu Gupta

(57) ABSTRACT

In traditional storage arrays, the number of clones permitted inside the storage array may be limited by the amount of available storage. Further, clones stored on the array may require significant storage resources. Thus, the number of clone stored by the storage array may also be limited by the storage system memory and not just by the disk space. Accordingly, example embodiments of the present invention allow for creating and maintaining a plurality (e.g., an unlimited number) of thin asynchronous clones in storage, even if replica storage is capable of storing only a limited number of snapshots. Further, example embodiments of the present invention allow clones to be freely attached and detached from the replication environment for various purposes.

20 Claims, 15 Drawing Sheets

CREATING AND MAINTAINING CLONES IN CONTINUOUS DATA PROTECTION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATION

This application is related to co-pending U.S. Pat. No. 8,966,827 entitled "METHOD AND APPARATUS FOR PREVENTING JOURNAL LOSS ON FAILOVER IN SYMMETRIC CONTINUOUS DATA PROTECTION REPLICATION" issued on Mar. 31, 2015, the contents of which are incorporated herein by reference in their entirety.

This application is related to U.S. Pat. No. 8,769,336 entitled "METHOD AND APPARATUS FOR PREVENTING JOURNAL LOSS ON FAILOVER IN SYMMETRIC CONTINUOUS DATA PROTECTION REPLICATION" issued on Jul. 1, 2014, the contents of which are incorporated herein by reference in their entirety.

TECHNICAL FIELD

This application relates to data protection.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

SUMMARY

Example embodiments of the present invention relate to a method, an apparatus, and a computer program product for creating and maintaining clones in continuous data protection. The method includes maintaining a production volume, maintaining a continuous data protection (CDP) copy of the production volume at a site, and storing a clone of the CDP copy of the production volume at the site.

BRIEF DESCRIPTION OF THE DRAWINGS

The above and further advantages of the present invention may be better under stood by referring to the following description taken into conjunction with the accompanying drawings in which.

DETAILED DESCRIPTION

Figure 1:
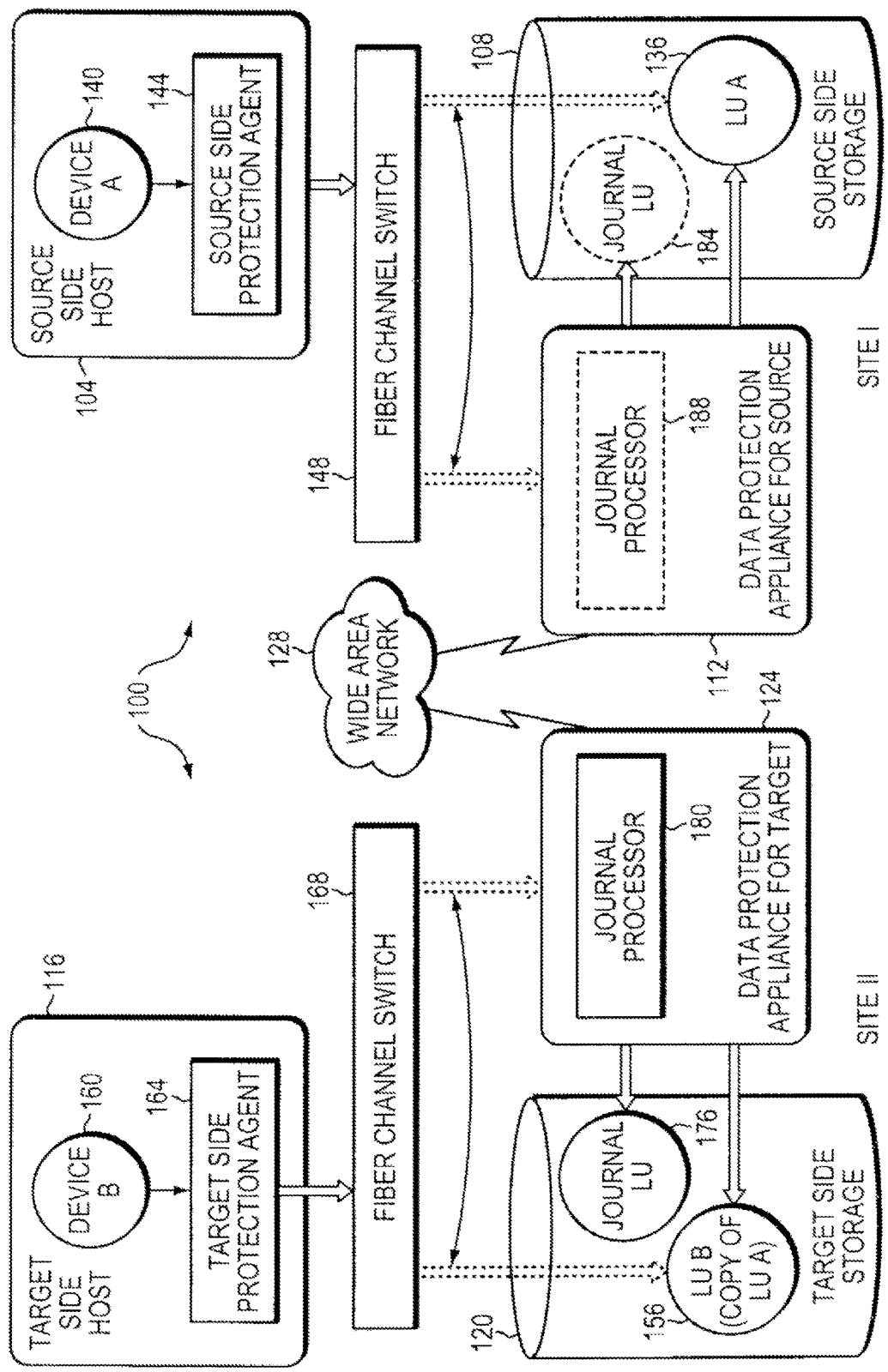
FIG. 1 is a simplified illustration of a data protection system, in accordance with an embodiment of the present invention.

The following definitions are employed throughout the specification and claims.

BACKUP SITE—a facility where replicated production site data is stored; the backup site may be located in a remote site or at the same location as the production site;

BLOCK VIRTUALIZATION—may be a layer which take back end storage volumes and, by slicing, concatenating and striping, creates a new set of volumes that serve as base volumes or devices in the virtualization layer;

CLONE—a clone may be a copy or clone of the image or images, drive or drives of a first location at a second location;

CONTINUOUS DATA PROTECTION (CDP)—may refer to a full replica of a volume or a set of volumes along with a journal which allows any point in time access, the CDP copy is at the same site, and may be in the same storage array as the production volume;

CONTINUOUS REMOTE REPLICATION (CRR)—may refer to a full replica of a volume or a set of volumes along with a journal which allows any point in time access at a site remote to the production volume and on a separate storage array;

DATA PROTECTION APPLIANCE (DPA)—a computer or a cluster of computers that serve as a data protection appliance, responsible for data protection services including inter alia data replication of a storage system, and journaling of I/O requests issued by a host computer to the storage system;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

DISTRIBUTED MIRROR—may be a mirror of a volume across a distance, either metro- or geo-, which is accessible at all sites;

FAIL ALL MODE—may be a mode of a volume in the splitter where all write and read I/Os intercepted by the splitter are failed to the host, but other SCSI command, like read capacity, are served;

GLOBAL FAIL ALL MODE—may be a mode of a volume in the virtual layer where all write and read I/Os to the virtual layer are failed to the host, but other SCSI commands, like read capacity, are served;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGGED ACCESS—may be an access method provided by the appliance and the splitter in which the appliance rolls the volumes of the consistency group to the point in time the user requested and let the host access the volumes in a copy on first write base;

LOGICAL UNIT—a logical entity provided by a storage system for accessing data from the storage system;

LUN—a logical unit number for identifying a logical unit;

MARKING ON SPLITTER—may be a mode in a splitter where intercepted I/Os are not split to an appliance and the storage, but rather changes (meta data) are tracked in a list and/or a bitmap and I/Os are sent immediately down the I/O stack;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

REPLICATION PROTECTION APPLIANCE (RPA)—another name for DPA;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period;

SPLITTER/PROTECTION AGENT—may be an agent running either on a production host a switch or a storage array which can intercept IO and split them to a DPA and to the storage array, fail IO redirect IO or do any other manipulation to the IO;

STORAGE MEDIUM—may refer to one or more storage mediums such as a hard drive, a combination of hard drives, flash storage, combinations of flash storage, combinations of hard drives, flash, and other storage devices, and other types and combinations of computer readable storage mediums including those yet to be conceived; a storage medium may also refer both physical and logical storage mediums and may include multiple level of virtual to physical mappings and may be or include an image or disk image;

STORAGE SYSTEM—a SAN entity that provides multiple logical units for access by multiple SAN initiators;

TARGET—a node in a SAN that replies to I/O requests;

TARGET SIDE—a receiver of data within a data replication workflow; during normal operation a back site is the target side, and during data recovery a production site is the target side;

VIRTUAL ACCESS—may be an access method provided by the appliance and the splitter in which the appliance exposes a virtual volume from a specific point in time to the host, the data for the virtual volume is partially stored on the remote copy and partially stored on the journal;

VIRTUAL VOLUME—may be a volume which is exposed to a host by a virtualization layer and may span across more than one site; and WAN—a wide area network that connects local networks and enables them to communicate with one another, such as the Internet.

Description of Embodiments Using a Five State Journaling Process

FIG. 1 is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit;
Redirect the SCSI command to another logical unit;
Split the SCSI command by sending it first to the respective DPA. After the DPA returns an acknowledgement, send the SCSI command to its intended logical unit;
Fail a SCSI command by returning an error return code; and
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
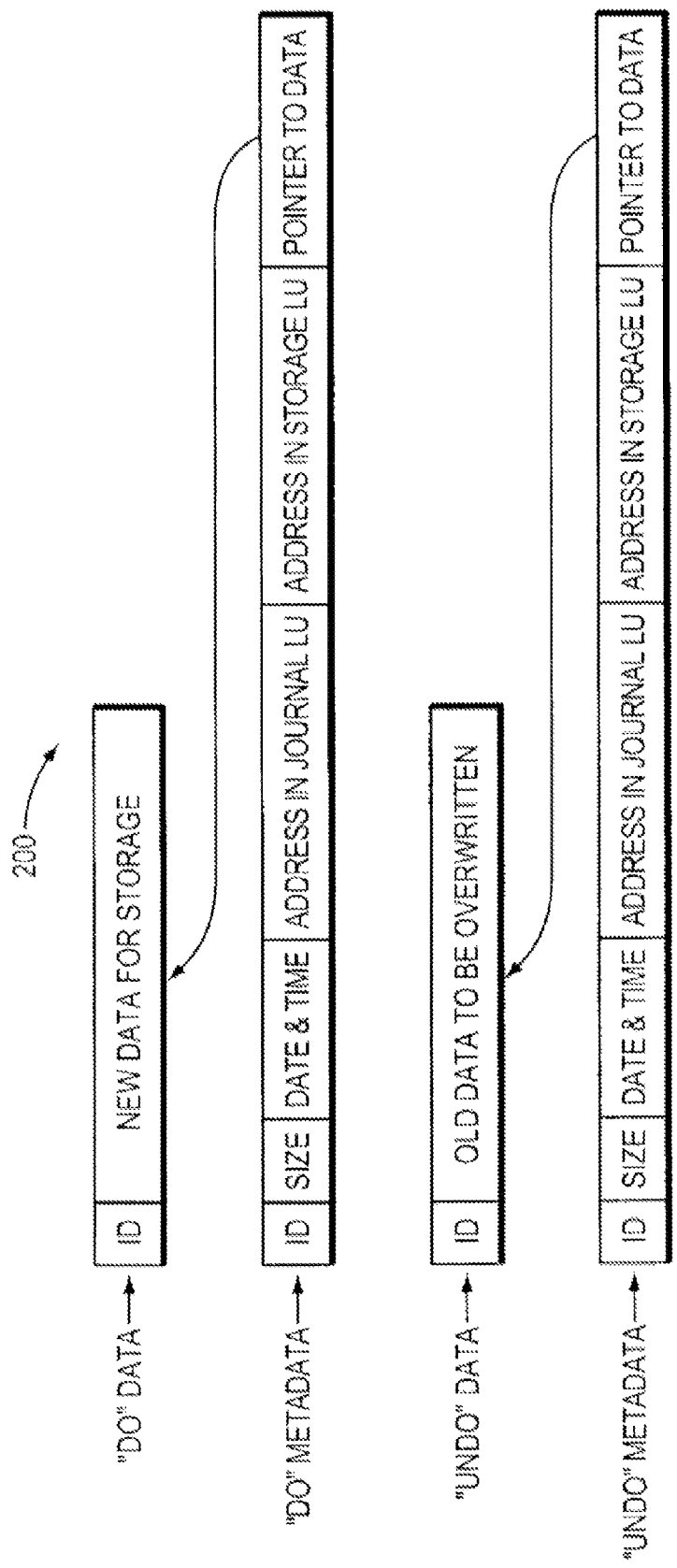
FIG. 2 is a simplified illustration of a write transaction for a journal, in accordance with an embodiment of the present invention.

FIG. 2 is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
 one or more identifiers;
 a time stamp, which is the date & time at which the transaction was received by source side DPA 112;
 a write size, which is the size of the data block;
 a location in journal LU 176 where the data is entered;
 a location in LU B where the data is to be written; and
 the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter mirrors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWERPATH), through an intelligent fabric switch, through array-based splitter, such as EMC CLARiiON.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica.

When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

A discussion of mirroring may be found in U.S. Pat. No. 7,346,805, entitled "PROTECTION OF MIRRORED DATA," issued on Mar. 18, 2008 and assigned to EMC Corporation of Hopkinton, Mass., which is hereby incorporated by reference in its entirety.

A discussion of journaling and some techniques associated with journaling may be found in U.S. Pat. No. 7,516,287, entitled "METHODS AND APPARATUS FOR OPTIMAL JOURNALING FOR CONTINUOUS DATA REPLICATION," issued on Apr. 7, 2009 and assigned to EMC Corporation of Hopkinton, Mass., which is hereby incorporated by reference in its entirety.

A discussion of dynamically adding storage for a journal may be found in U.S. Pat. No. 7,840,536, entitled "METHODS AND APPARATUS FOR DYNAMIC JOURNAL EXPANSION," issued on Nov. 23, 2010 and assigned to EMC Corporation of Hopkinton, Mass., which is hereby incorporated by reference in its entirety.

Creating and Maintaining Clones in Continuous Data Protection

In traditional storage arrays, the number of clones permitted inside the storage array may be limited by the amount of available storage. Further, clones stored on the array may require significant storage resources. Thus, the number of clone stored by the storage array may also be limited by the storage system memory and not just by the disk space. A storage may be able to maintain, for example, up to 16 copies of a volume (e.g., thin or thick). Example embodiments of the present invention overcome these, as well as other, deficiencies, by creating full clones of the data, which take no resource from the storage. With, for example, 16 thick clones, a user will be able to create, for example, 16 thin clones of each thick clone, thereby allowing the user to have, for example, 256 thin clones in total.

Accordingly, example embodiments of the present invention allow for creating and maintaining a plurality (e.g., an unlimited number) of thin asynchronous clones in storage, even if replica storage is capable of storing only a limited number of snapshots. A DPA 355 (e.g., a virtual or physical appliance) allows the creation of clones in a network of single volume over many storage arrays and manage all of them together as one entity. Further, example embodiments of the present invention allow clones to be freely attached and detached from the replication environment for various purposes. Such features are relevant to storage arrays by EMC Corporation of Hopkinton, Mass., such as Clariion and Symmetrix VMAXe, but also all other storage arrays and splitters.

FIGS. 3A-3E are block diagrams illustrating example data protection environments 302 in which a plurality of clones (e.g., CDP clones $365_1$-1-$365_1$-3, $365_2$-1-$365_2$-2 of a CDP copy $365_1$, $365_2$ and CRR clones $367_1$-1-$367_1$-3, $367_2$-1-$367_2$-2 of a CRR copy $367_1$, $367_2$) of a set of volumes $355_1$, $355_2$ at a site 300 are maintained. As illustrated in FIGS. 3A-3E, each volume $355_1$, $355_2$ can have a different number of clones (e.g., Volume 1 $355_1$ has three CDP clones $365_1$-1-$365_1$-3, in FIGS. 3A-3C and three CRR clones $367_1$-1-$367_1$-3, in FIGS. 3D-3E and Volume 2 $355_2$ has two CDP clones $365_2$-1-$365_2$-2 in FIGS. 3A-3C and two CRR clones $367_2$-1-$367_2$-2 in FIGS. 3D-3E.

Figure 3A:
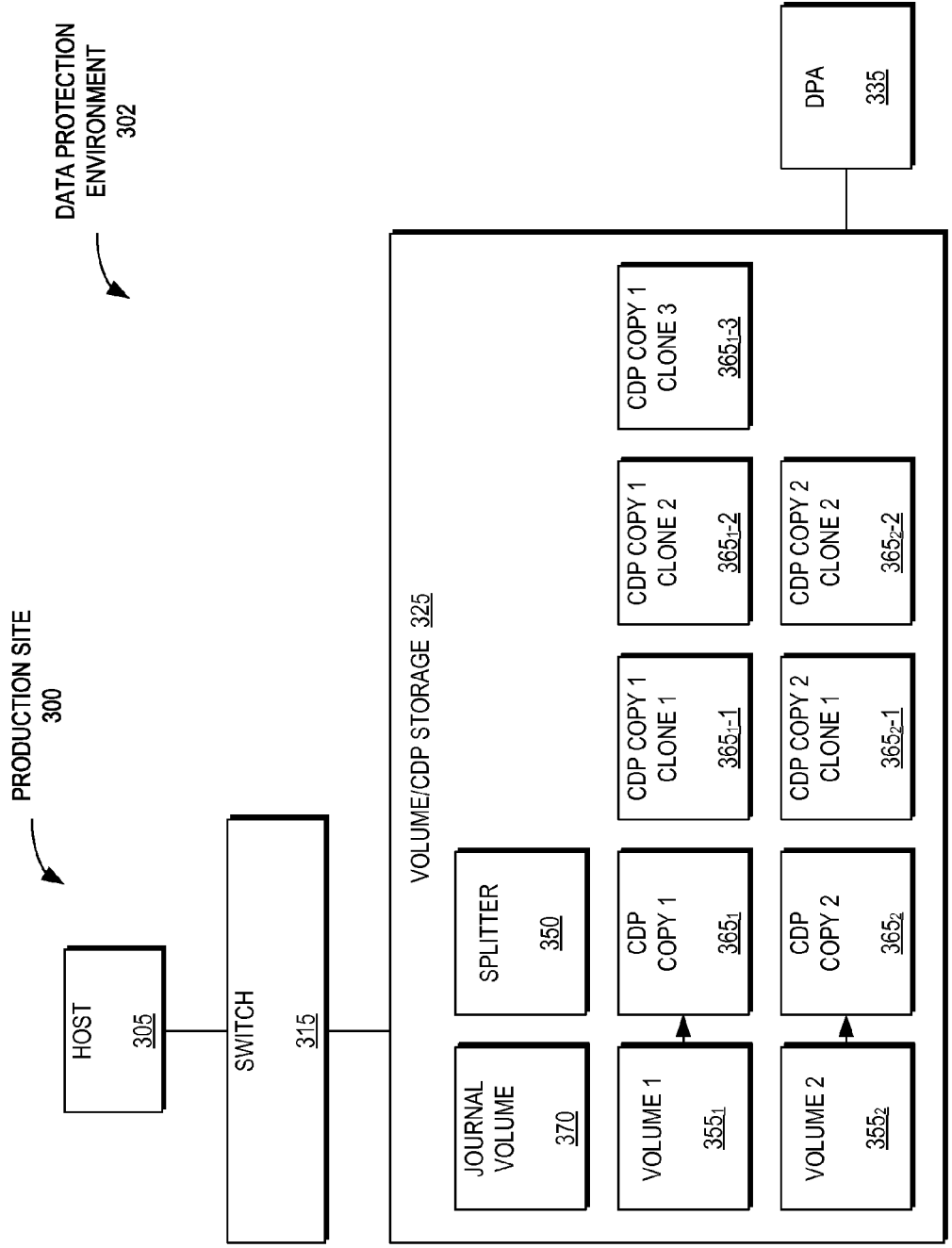
FIGS. 3A-3C are block diagrams illustrating example data protection environments in which a plurality of clones of a CDP copy of a production volume are maintained.
Figure 3B:
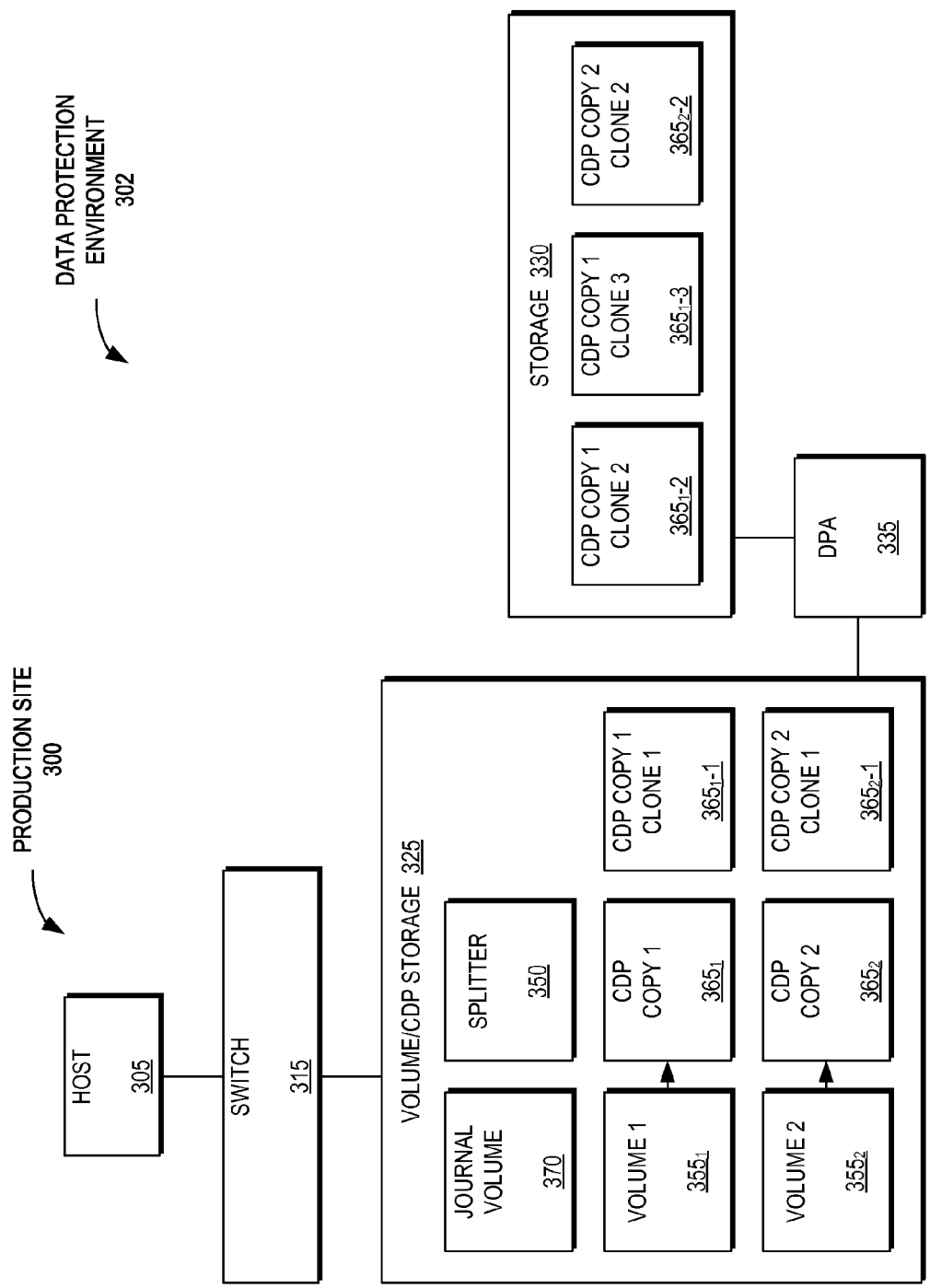
Figure 3C:
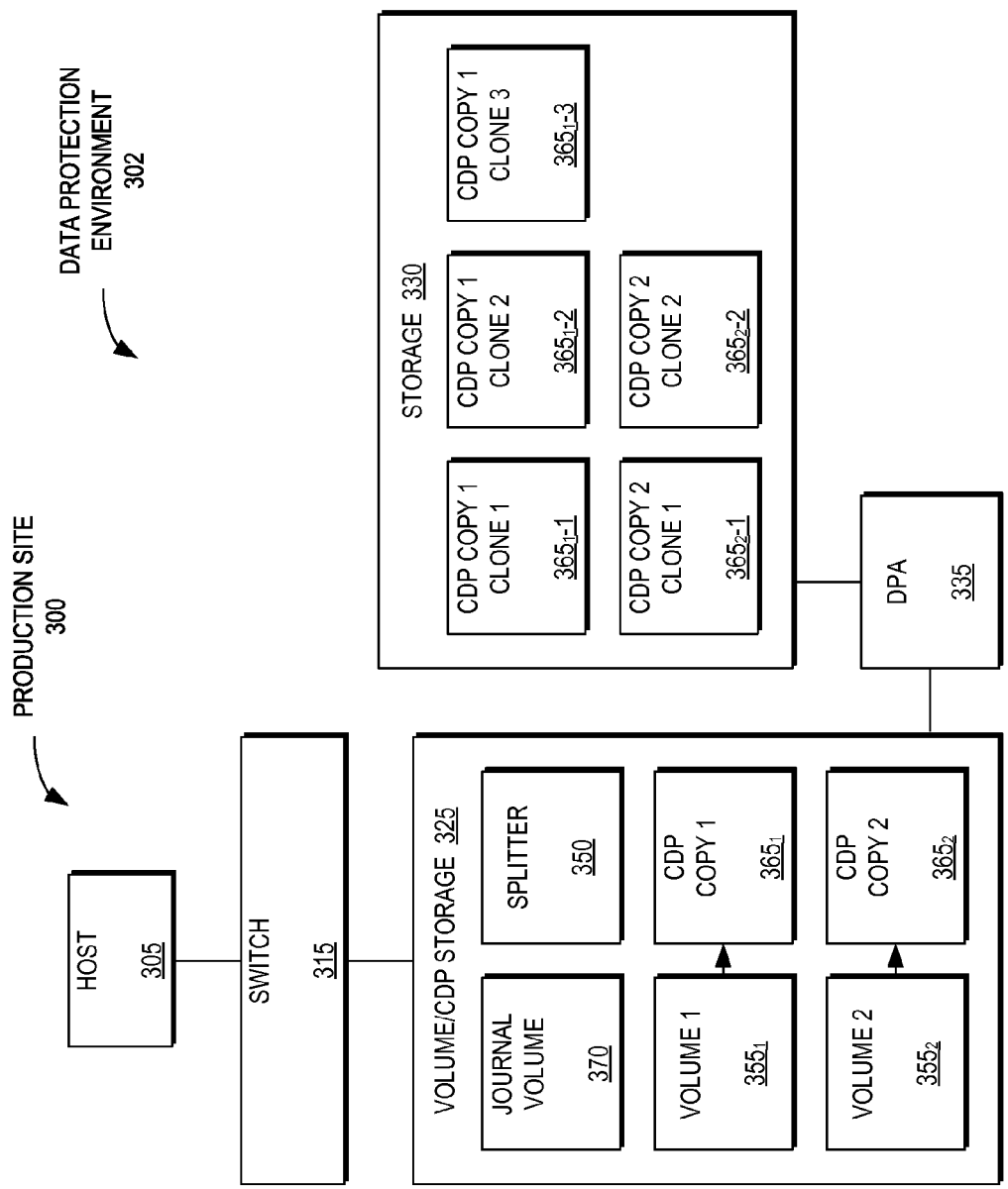

Specifically, FIGS. 3A-3C are block diagrams illustrating example data protection environments 302 in which a plurality of CDP clones $365_1$-1-$365_1$-3, $365_2$-1-$365_2$-2 of a CDP copy $365_1$, $365_2$ of a set of volumes $355_1$, $355_2$ at a production site 300 are maintained. As described above, CDP may refer to a full replica (i.e., CDP Copy 365) of a volume or a set of volumes (i.e., Volumes 1-2 $355_1$-$355_2$) along with a journal 370 which allows any point in time access, the CDP copy 365 is at the same site 300, and may be in the same storage array as the volume (i.e., CDP storage 325 may be one or more storage arrays at the same site 300).

Figure 3D:
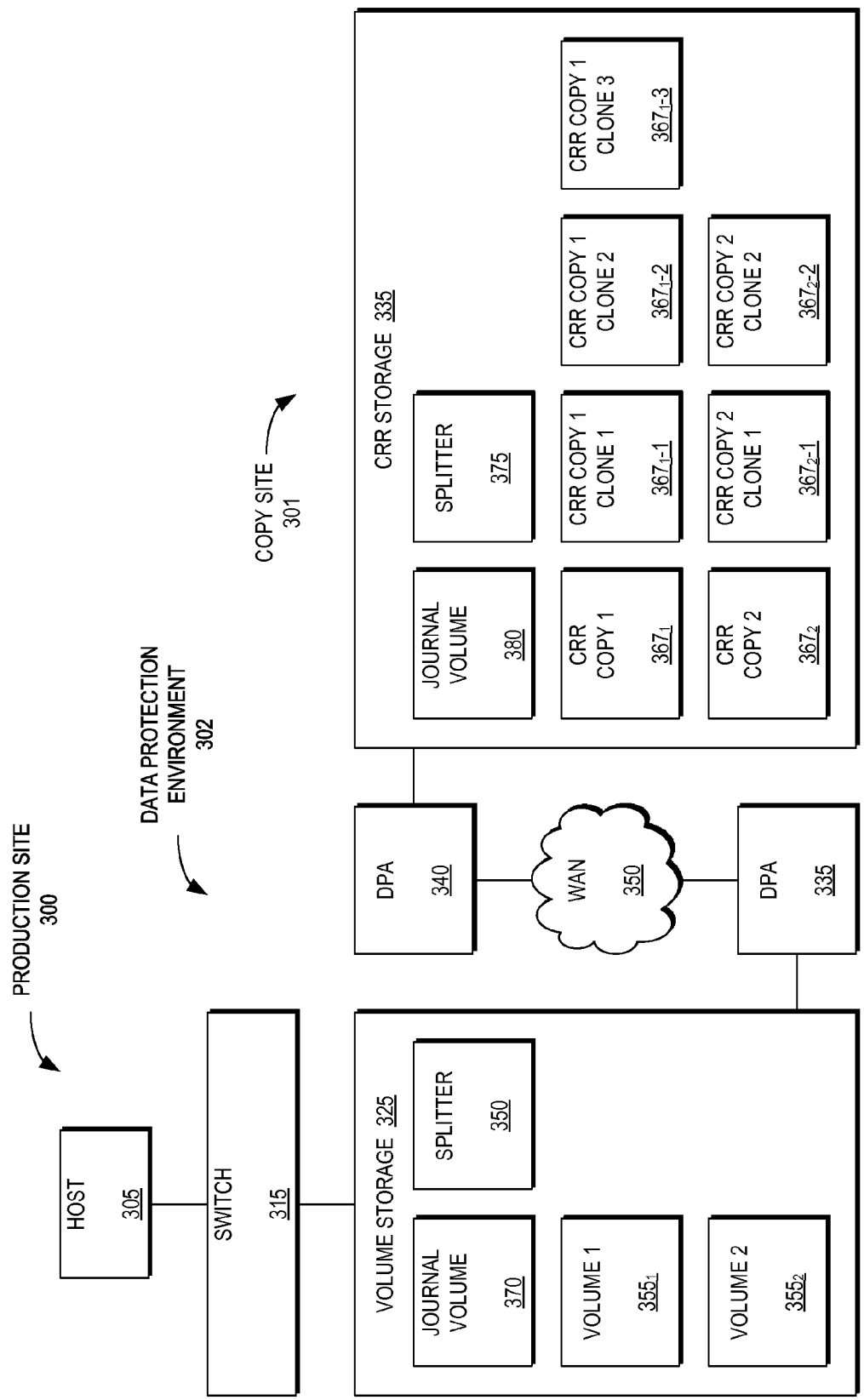
FIGS. 3D-3E are block diagrams illustrating example data protection environments in which a plurality of clones of a CRR copy of a production volume are maintained.
Figure 3E:
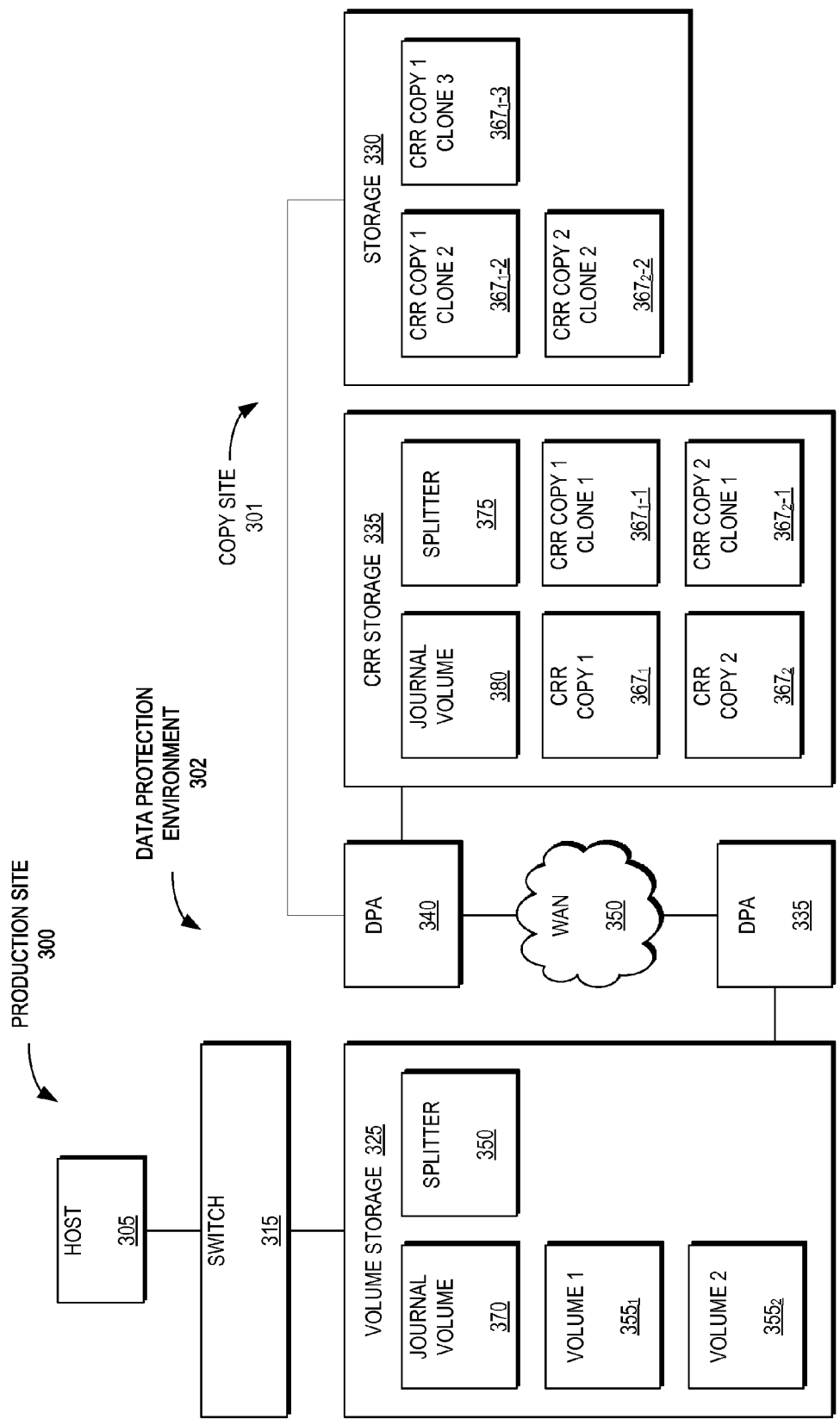

Likewise, FIGS. 3D-3E are block diagrams illustrating example data protection environments 302 in which a plurality of CRR clones $367_1$-1-$367_1$-3, $367_2$-1-$367_2$-2 of a CRR copy $367_1$, $367_2$ of a set of volumes $355_1$, $355_2$ at a site 300 are maintained. As described above, CRR may refer to a full replica (i.e., CRR Copy 367) of a volume or a set of volumes (i.e., Volumes 1-2 $355_1$-$355_2$) along with a journal 370 which allows any point in time access at a site 300 remote to the volume and on a separate storage array (i.e., CRR storage 335 may be one or more storage arrays remote from the storage 325 at the site 300).

Figure 4:
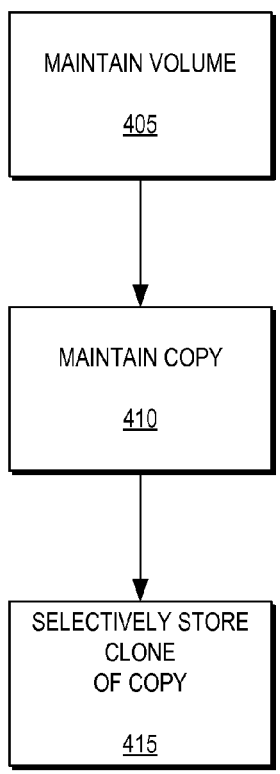
FIG. 4 is a flow diagram illustrating an example method for creating and maintaining clones of a volume according to example embodiments of the present invention.

The example embodiments of FIGS. 3A-3E may be studied in conjunction with the flow diagram of FIG. 4.

FIG. 4 is a flow diagram illustrating an example method for creating and maintaining clones of a volume.

To create a clone of a copy, the system creates a new LU at a storage array which is on the same site as the copy (i.e., if the copy is a CDP copy, the clone LU will be at an array at the local site; if the cope is a CRR copy, the clone LU will be at the replica site.

Once the clone is created, the system works to make the clone identical to the copy volume. For this, the DPA maintains in the journal a differential bitmap between each copy and the clone. Each bit may indicate that a part of the device may be different between the copy and its clone. Further, each bit in the bitmap may indicate that, for example, 1 MB or 64 KB of data is different. The system may include a background process which reads the bitmap in search for the next dirty location. If a dirty location is found, the data will be copied from the copy to its clone.

Once all the data has been copied, the clone will be marked as identical to the copy and then may be detached (i.e., a clone may be attached immediately, but may be detached when fully synchronized). Once the clone is identical to the copy it will remain identical to it as long as it remains attached. In other words, any write to the copy will be written to the clone. Thus, for example, if the copy is moved to an old point in time, the clone will move to the same point in time.

As illustrated in FIG. 4, with reference to FIGS. 3A-3E, the method includes maintaining a volume $355_1$, $355_2$ (405) at a production site 300. Further, a copy $365_1$, $365_2$, $367_1$, $367_2$ of the volume may be maintained at a copy site 301 (410). For CDP copies, the copy site 301 (not shown) is the production site 300. The copies $365_1$, $365_2$, $367_1$, $367_2$ are maintained by the DPA 335, 340 performing journal-based replication. As described above, in CDP, CDP copies $365_1$, $365_2$ are stored at the same site 300 as the volumes $355_1$, $355_2$.

In the example embodiments of FIGS. 3D-3E in which the copy is a CRR copy $367_1$, $367_2$, the copy site 301 is distinct from the production (i.e., volume) site 300. As described above, in CRR, CRR copies $367_1$, $367_2$ are stored in a separate storage array (e.g., CRR storage 335) than the volume $355_1$, $355_2$ (e.g., volume storage 325).

Referring back to FIG. 4, methods according to an example embodiment of the present invention also include selectively storing a clone $365_1$-1-$365_1$-3, $365_2$-1-$365_2$-2, $367_1$-1-$367_1$-3, $367_2$-1-$367_2$-2 of the copy $365_1$, $365_2$, $367_1$, $367_2$ of the volume $355_1$, $355_2$ at the production site 300, the copy site 301 or a storage 330 (415).

As illustrated in FIG. 3A, all CDP clones $365_1$-1-$365_1$-3, $365_2$-1-$365_2$-2 of a CDP copy $365_1$, $365_2$ may be stored (415) on the same storage 325 where the CDP copy $365_1$, $365_2$ is stored. For example, CDP Copy 1 Clones 1-3 $365_1$-1-$365_1$-3 and CDP Copy 2 Clones 1-2 $365_2$-1-$365_2$-2 may be stored (415) with CDP Copy 1 $365_1$ and CDP Copy 2 $365_2$ at the production site 300 on the storage 325.

As illustrated in FIG. 3B, one or more of the CDP clones $365_1$-1-$365_1$-3, $365_2$-1-$365_2$-2 of a CDP copy $365_1$, $365_2$ may be stored (415) on a storage 330 different from the volume/CDP storage 325 where the CDP copy $365_1$, $365_2$ is stored. For example, CDP Copy 1 Clone 1 $365_1$-1 and CDP Copy 2 Clone 1 $365_2$-1 may be stored (415) with CDP Copy 1 $365_1$ and CDP Copy 2 $365_2$ at the production site 300 on the storage 325 while CDP Copy 1 Clone 2 $365_1$-2, CDP Copy 1 Clone 3 $365_1$-3 and CDP Copy 2 Clone 2 $365_2$-2 may be stored (415) at the production site 300 on storage 330 different than the storage 325. Note that the storage 330 may be one or more physical or logical storage devices.

As illustrated in FIG. 3C, all of the CDP clones $365_1$-1-$365_1$-3, $365_2$-1-$365_2$-2 of a CDP copy $365_1$, $365_2$ may be stored (415) on a storage 330 different from storage 325 where the CDP copy $365_1$, $365_2$ is stored. For example, CDP Copy 1 Clones 1-3 $365_1$-1-$365_1$-3 and CDP Copy 2 Clones 1-2 $365_2$-1-$365_2$-2 may be stored (415) at the production site 300 on storage 330 different than storage 325. Note that the storage 330 may be one or more physical or logical storage devices. CDP copies $365_1$, $365_2$ also may be stored at storage 330 different than storage 325.

As illustrated in FIG. 3D, all CRR clones $367_1$-1-$367_1$-3, $367_2$-1-$367_2$-2 of a CRR copy $367_1$, $367_2$ may be stored (415) on the same CRR storage 335 where the CRR copy $367_1$, $367_2$ is stored. For example, CRR Copy 1 Clones 1-3 $367_1$-1-$367_1$-3 and CRR Copy 2 Clones 1-2 $367_2$-1-$367_2$-2 may be stored (415) with CRR Copy 1 $367_1$ and CRR Copy 2 $367_2$ at the copy site 301 on the CRR Storage 335.

As illustrated in FIG. 3E, one or more of the CRR clones $367_1$-1-$367_1$-3, $367_2$-1-$367_2$-2 of a CRR copy $367_1$, $367_2$ may be stored (415) on a storage 330 different from the CRR storage 335 where the CRR copy $367_1$, $367_2$ is stored. For example, CRR Copy 1 Clone 1 $367_1$-1 and CRR Copy 2 Clone 1 $367_2$-1 may be stored (415) with CRR Copy 1 $367_1$ and CRR Copy 2 $367_2$ at the copy site 301 on the CRR Storage 335 while CRR Copy 1 Clone 2 $367_1$-2, CRR Copy 1 Clone 3 $367_1$-3 and CRR Copy 2 Clone 2 $367_2$-2 may be stored (415) at the copy site 301 on storage 330 different than the CRR Storage 335. Note that the storage 330 may be one or more physical or logical storage devices.

Figure 5:
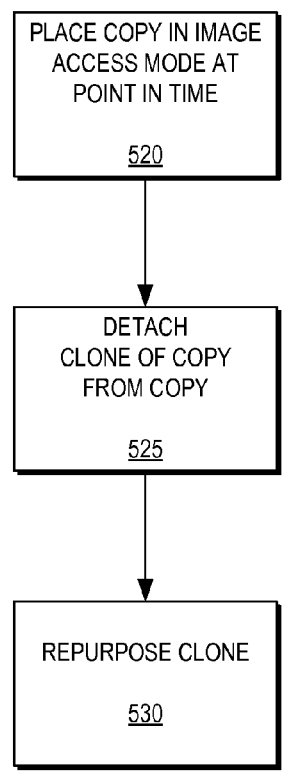
FIG. 5 is a flow diagram illustrating an example method for repurposing a clone.

FIG. 5 is a flow diagram of a method according to an example embodiment of the present invention for repurposing a clone (e.g., clones $365_1$-1-$365_1$-3, $367_1$-1-$367_1$-3 of FIGS. 3A-3J). After receiving an indication of a particular point in time for which the clone will be repurposed, the copy (e.g., CDP copy $365_1$, $365_2$ or CRR copy $367_1$, $367_2$) of the volume (e.g. volume $355_1$, $355_2$) is rolled to the point in time the user requested as described above with respect to 5 phase distribution If the point in time is before the current point in time indicate by the CDP/CRR copy, the system will read data from the undo stream, calculate the data needed to be written to the redo log (i.e., read the data from the locations which are about to be overwritten), write the data to the beginning of the redo log in the journal, and then apply the data to the CDP/CRR copy and its clones.

A clone (e.g., clones $365_1$-1-$365_1$-3, $365_2$-1-$365_2$-2, $367_1$-1-$367_1$-3, $367_2$-1-$367_2$-2) of the copy of the volume may be detached from the copy of the volume for repurposing. Detaching the volume means that a user may access the data in the volume and change it. The clone no longer remains identical to the CDP/CRR copy. The user can use the clone as another production volume. In order to allow faster re-attachment of the clone to the CDP/CRR copy, the changes the user makes to the clone may be tracked. In order to track the changes, either the volume is attached to the splitter which will track the clone changes or an array function (e.g., differential data facility (DDF) bitmap) tracks the changes to the clone. The CDP copy will track the clone as detached, and will also track all the changes that happened to the CDP copy while the clone was detached. The user may detach each clone at a separate point in time as the clones are not dependant of each other.

Each clone may be in one of the following states: in sync, syncing, error and detached. The clone state is maintained by the DPA 335, 340, and changes to the clone state are scheduled through the DPA 335, 340.

Figure 6:
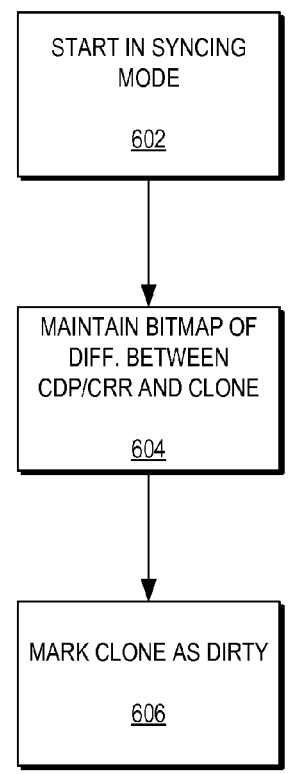
FIG. 6 is a flow diagram illustrating a method according to an example embodiment of the present invention for applying I/Os received at a clone of a volume.

FIG. 6 is a flow diagram illustrating an example method according to an example embodiment of the present invention for adding a new clone of a volume to a consistency group. As illustrated in FIG. 6, the clone may start in syncing mode (602). The DPA 335. 340 may maintain a bitmap of the differences between the CDP/CRR copy and the clone (604). Accordingly, the bitmap will mark the entire clone as dirty (606) so it will be updated via the syncing state.

Figure 7:
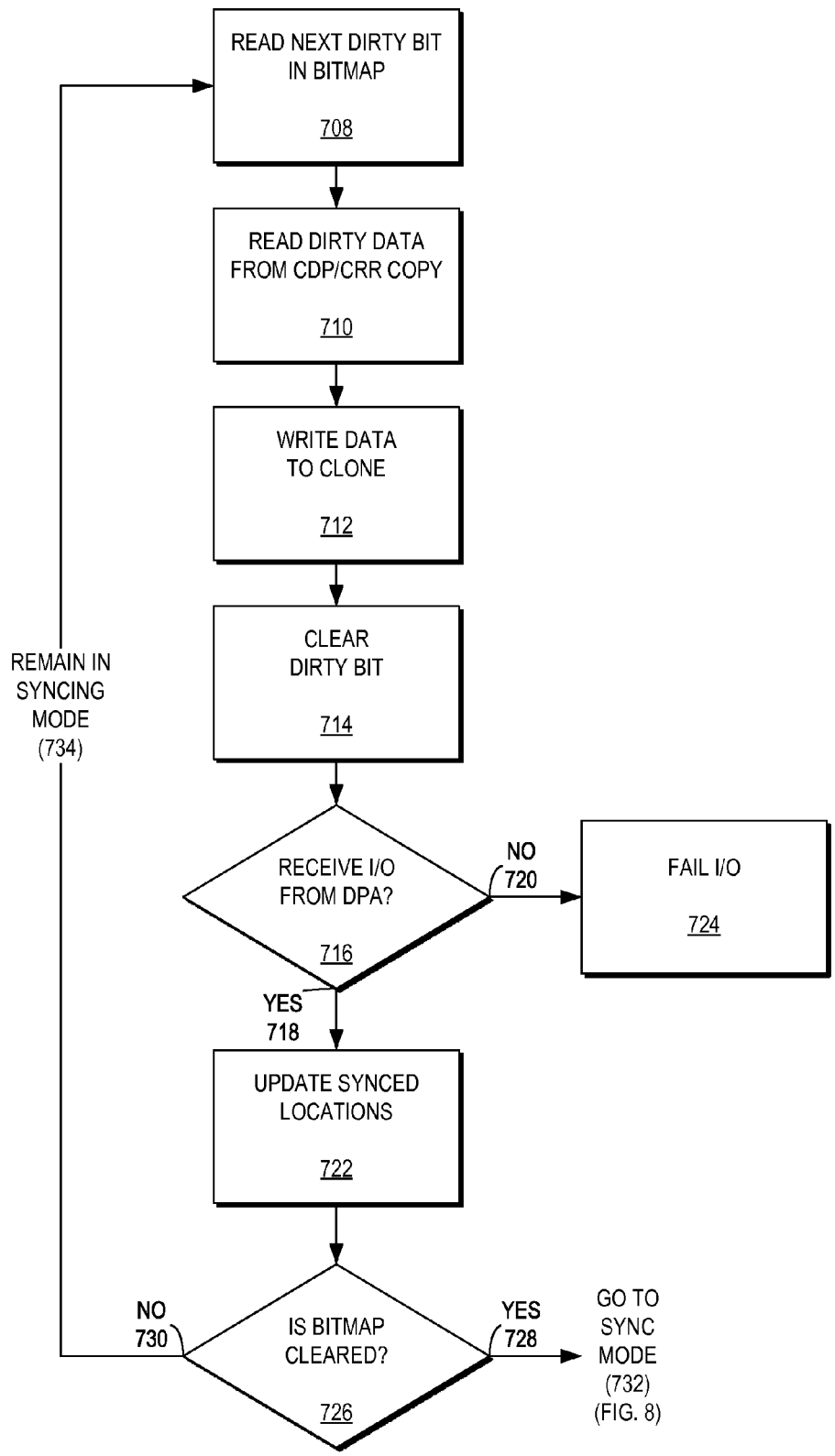
FIG. 7 is a flow diagram illustrating an example method according to an example embodiment of the present invention for the syncing state.

FIG. 7 is a flow diagram illustrating an example method according to an example embodiment of the present invention for the syncing state. First, a background process reads the next dirty bit in the bitmap (708) and reads the dirty data from the CDP/CRR copy (710). Data is then written to the clone (712) and the dirty bit is cleared from bitmap (714). The clone may receive I/Os (716), such as from the DPA. If the DPA 335, 340 tries to do 5 phase distribution while the clone is in the syncing state (718), when the system updates the CDP/CRR copy, it also updates the clones if the location updated is already synced by the clone (i.e., the bit in the bitmap is cleared) (722) All other I/Os to the clone not generated by the DPA (720) are failed (724). If the bitmap is cleared (726) (728) the clone moves to the sync mode (732). If not (730), the clone remains in the syncing mode (734). IOs to the clone can only be received from the DPA other IOs will fail (724).

Figure 8:
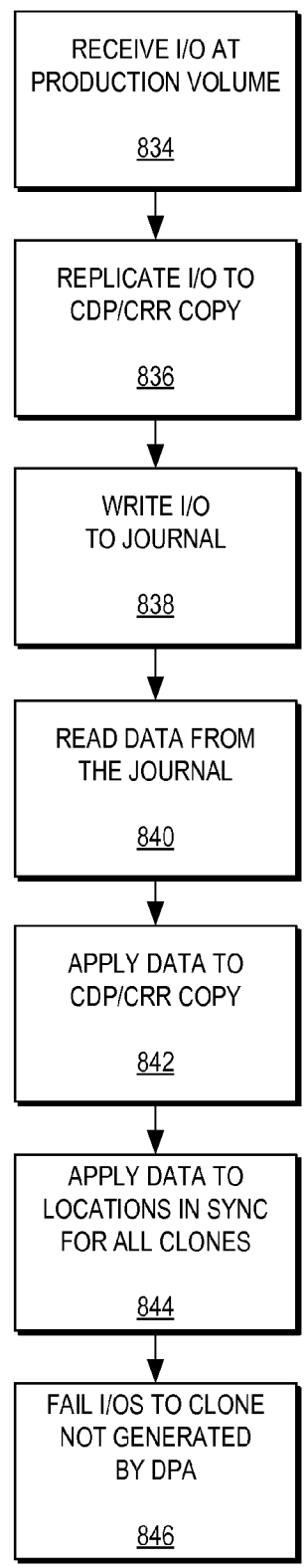
FIG. 8 is a flow diagram illustrating an example method according to an example embodiment of the present invention for the sync state.

FIG. 8 is a flow diagram illustrating an example method according to an example embodiment of the present invention for the sync state. First, an IO is received at the production volume (834) which is then replicated to the CDP/CRR copy (836) and written to the journal (838). At a later time, the 5 phase distribution reads the data from the journal (840) and applies it to the CDP/CRR copy (842). Data also is applied to all locations which are in sync for all the clones (844). If a clone is in sync mode, any I/O written to the CDP/CRR copy is written to the clone. All I/Os to the clone not generated by the DPA 335, 340 are failed (846) (i.e., the clone cannot be accessed by the user).

Figure 9:
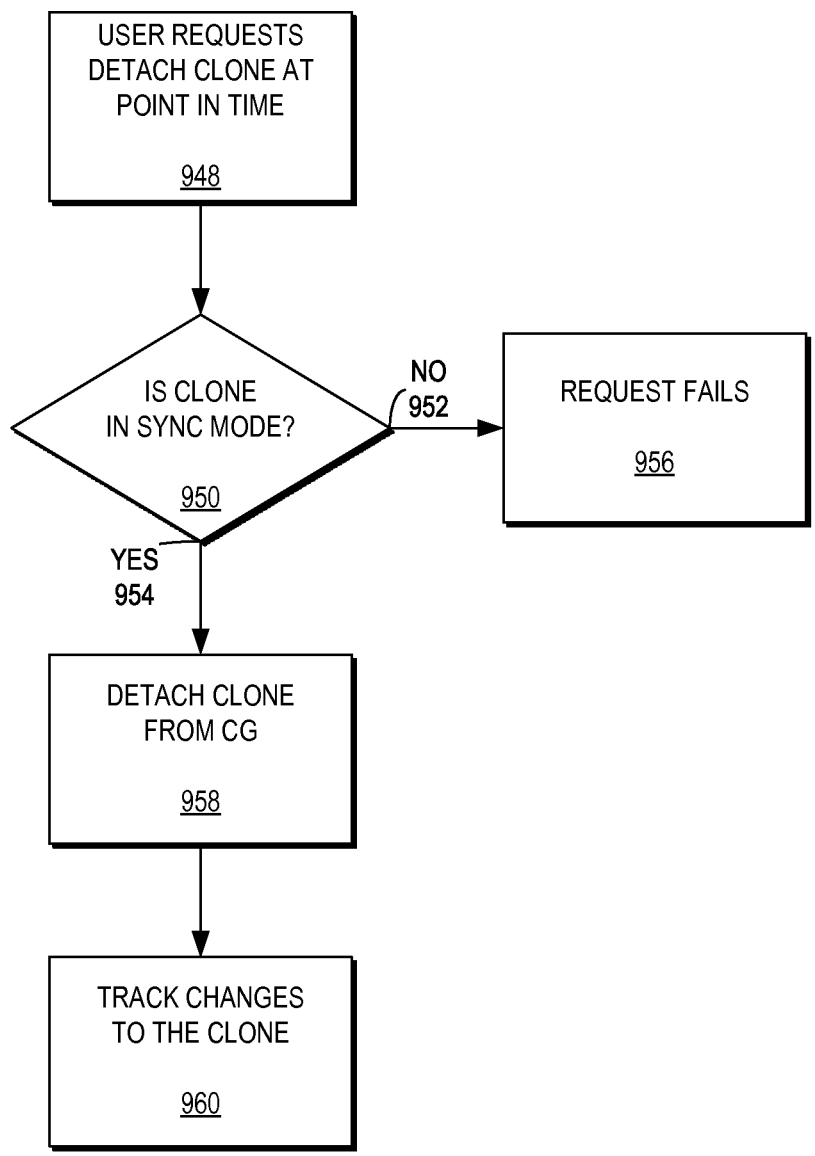
FIG. 9 is a flow diagram illustrating an example method according to an example embodiment of the present invention for the detached state.

FIG. 9 is a flow diagram illustrating an example method according to an example embodiment of the present invention for the detached state. First, a user requests to detach a specific clone at a specific point in time (948). The DPA 335, 340 then determines whether the clone is in sync mode and, therefore, may be detached (950). If the clone is not in sync mode (952) the request fails (956). If the clone is in sync mode (954) the clone is detached from CG (958). Changes to the clone are then tracked (960), either via a DDF bitmap or the splitter 350, 375 attached to clone. Since tracking changes in the splitter may request significant amount of space at the storage array, the splitter may periodically send the changes to the DPA, which can store them in the delta marker stream in a journal. Thus the splitter may use a limited amount of space.

Accordingly, a user may send I/Os to the clone, with each I/O to the clone being tracked either in the DDF bitmap or the splitter. Further, the CDP copy no longer updates the clone but rather an IO which is applied to the CDP copy is marked as dirty in the bitmap the CDP copy maintains for the clone.

Figure 10:
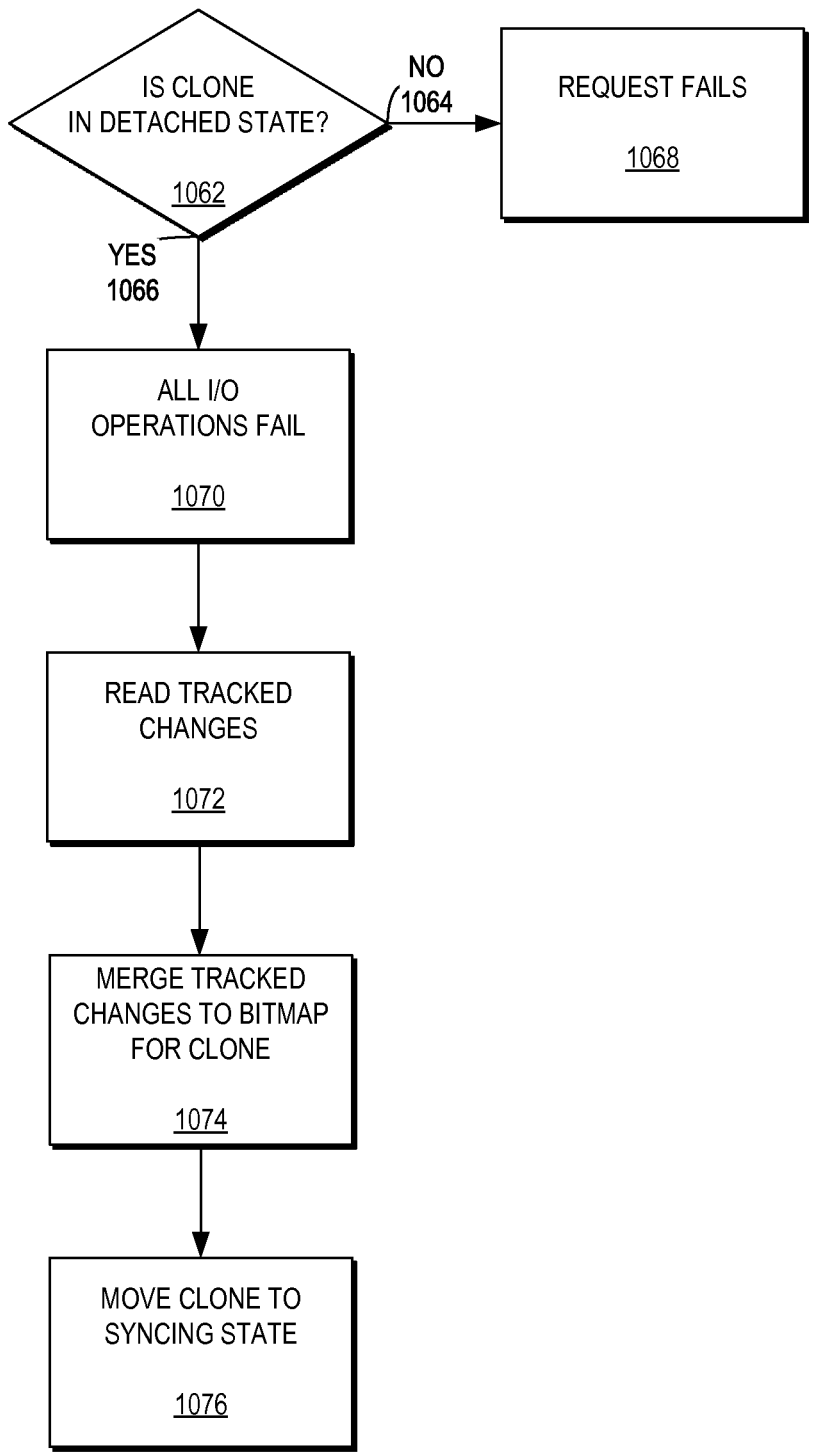
FIG. 10 is a flow diagram illustrating an example method according to an example embodiment of the present invention for attaching a clone.

FIG. 10 is a flow diagram illustrating an example method according to an example embodiment of the present invention for attaching a clone. First, the DPA 335, 340 determines whether the clone is in the detached state (1062). If the clone is not in the detached state (1064), the request to attach the clone fails (1068). Otherwise, if the clone is in the detached state (1066), the system no longer allows the clone to be accessed by hosts different than the DPA, and all I/O operations fail (1070). The tracked changes (e.g., from the DDF bitmap or the splitter bitmap) are read (1072) and merged to the bitmap the CDP/CRR copy maintains for the clone (1074). The DPA 335, 340 then moves the clone to the syncing state (1076).

Figure 11:
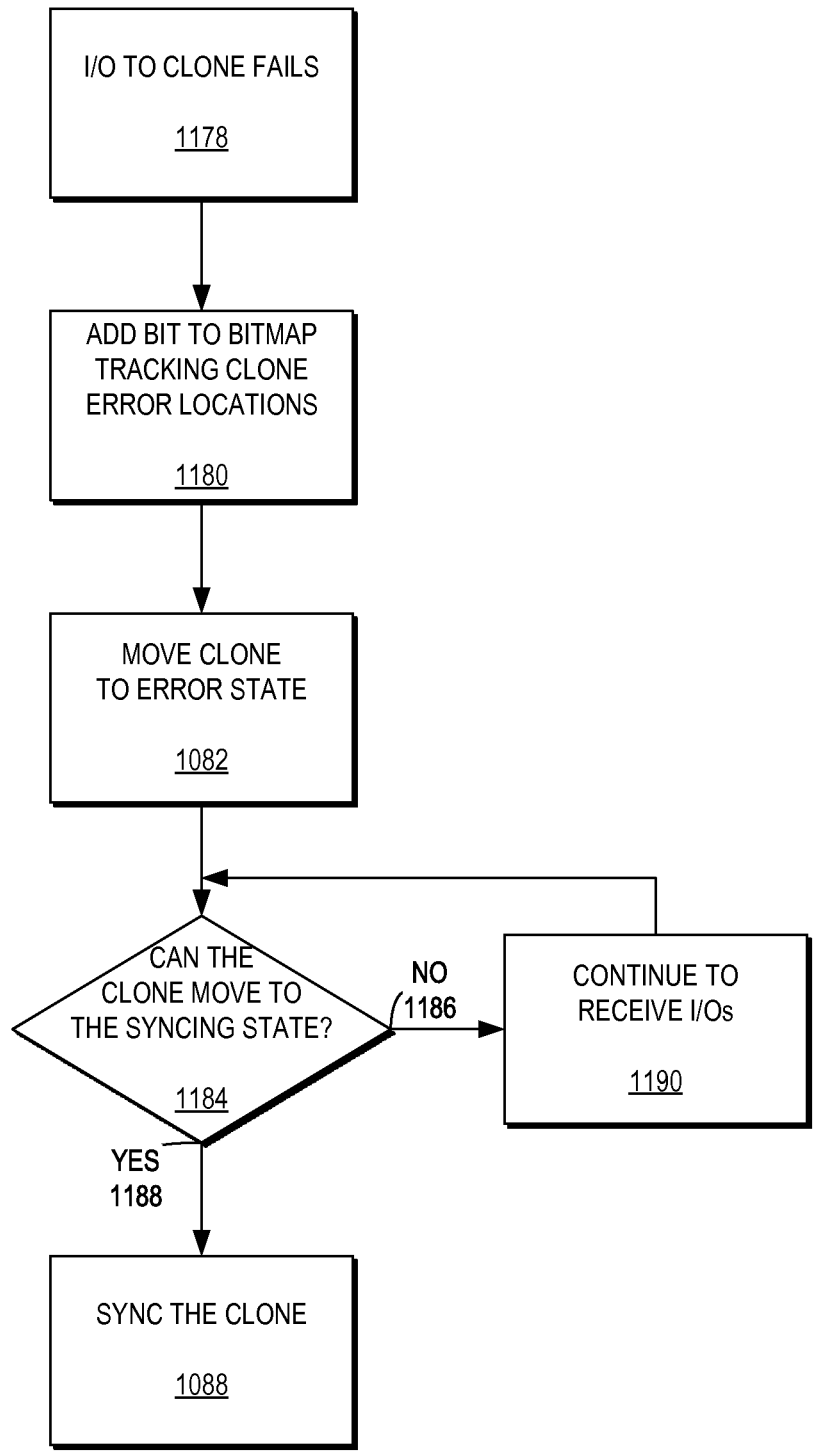
FIG. 11 is a flow diagram illustrating an example method according to an example embodiment of the present invention for error handling.

FIG. 11 is a flow diagram illustrating an example method according to an example embodiment of the present invention for error handling. First, an I/O to a clone fails (1178). A bit is then added to the bitmap tracking the clone error locations (1180). The DPA 335, 340 then moves clone to the error state (1182). The system periodically attempts to move the clone from the error state to the syncing state (1184). If the system fails to move from the error state to the syncing state (1186), such as if the bit added to the bitmap still tracks error locations, the system continues to receive I/Os (1190) and continues to periodically attempt to move the clone from the error state to the syncing state (1184). However, if the system does move from the error state to the syncing state (1188), the system syncs the clone (1188) as described above.

Figure 12:
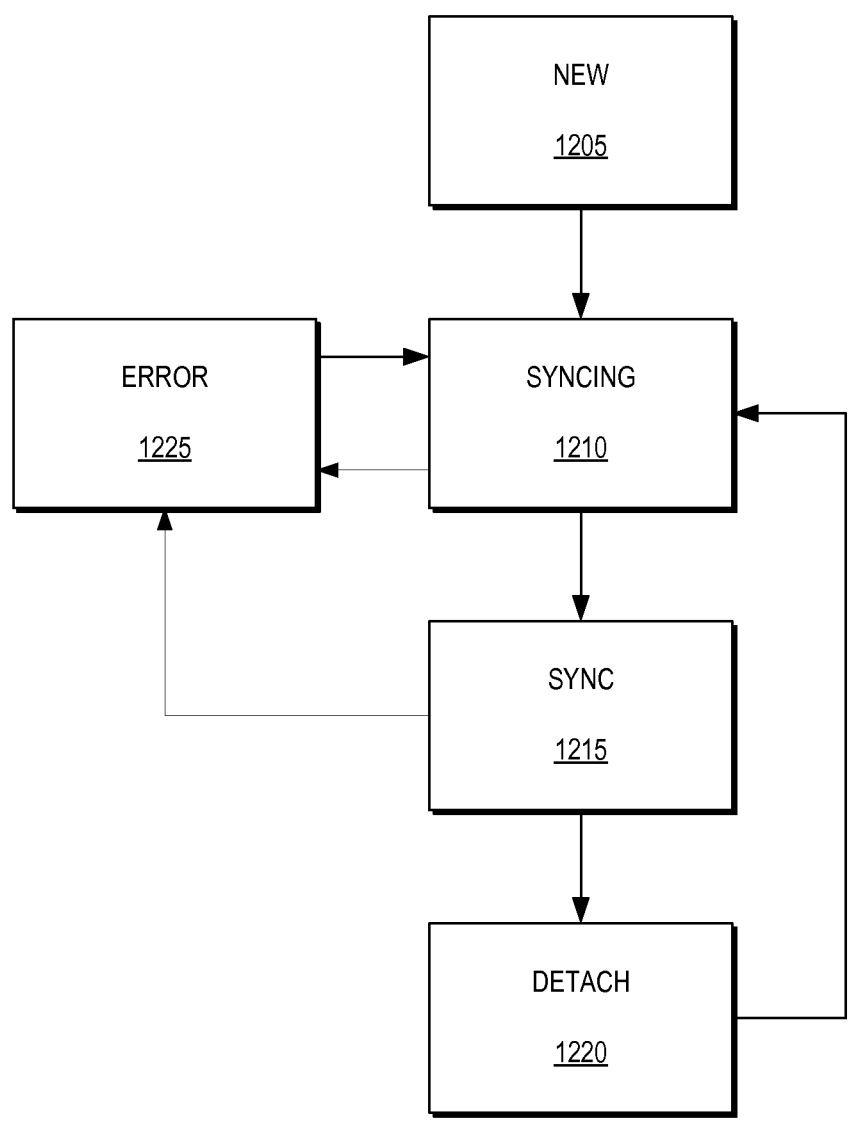
FIG. 12 is a flow diagram illustrating transitions between the states of FIGS. 7-11 according to an example embodiment of the present invention.

Thus, as illustrated in FIG. 12, the states may transition from new (1205) to syncing (1210), from syncing (1210) to sync (1215), from sync (1215) to detach (1220) and from detach (1220) to syncing (1210). Either of states syncing (1210) or sync (1215) may transition to error (1225) and then from error (1225) to syncing (1210).

Figure 13:
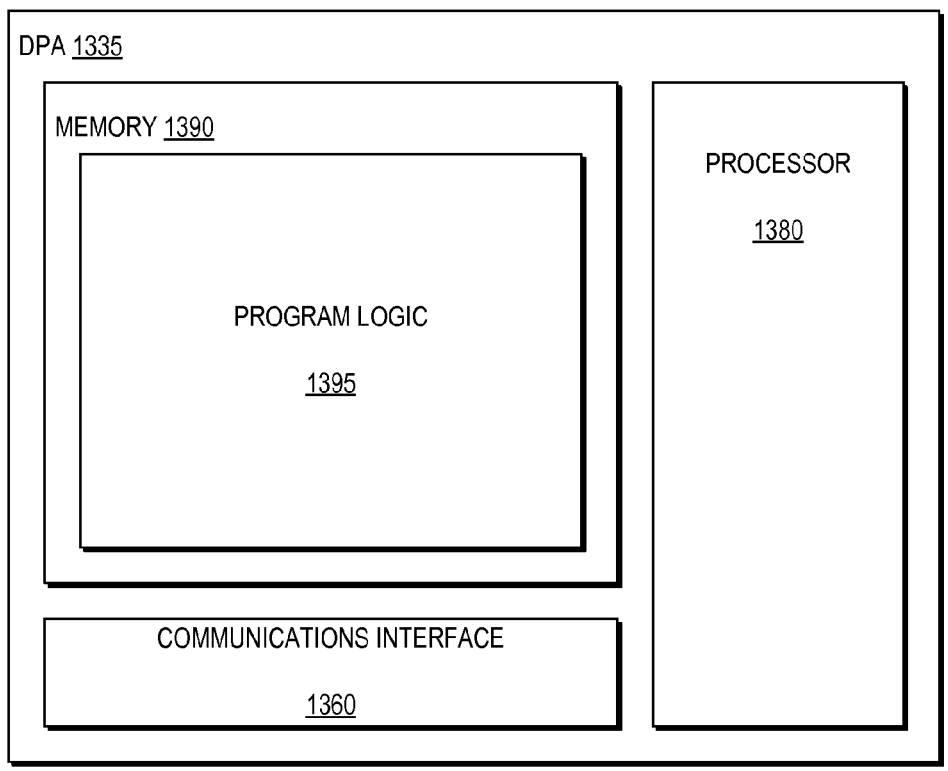
FIG. 13 is a block diagram of an example embodiment apparatus according to the present invention.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer 1335 of FIG. 13 the machine becomes an apparatus for practicing the invention. When implemented on one or more general-purpose processors, the program code 1395 combines with such a processor 1380 to provide a unique apparatus that operates analogously to specific logic circuits. As such a general purpose digital machine can be transformed into a special purpose digital machine.

Figure 14:
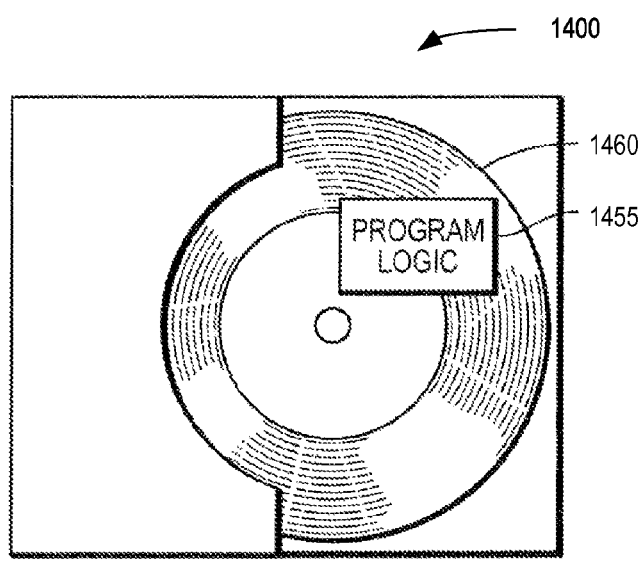
FIG. 14 is an illustration of an example embodiment of the present invention as embodied in program code.

FIG. 14 shows Program Logic 1455 embodied on a computer-readable medium 1460 as shown, and wherein the Logic is encoded in computer-executable code configured for carrying out the reservation service process of this invention and thereby forming a Computer Program Product 1400.

The logic for carrying out the method may be embodied as part of the aforementioned system, which is useful for carrying out a method described with reference to embodiments shown in, for example, FIGS. 1-6. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method of performing data replication in a data replication environment comprising a volume at a production site and a copy of the volume at a copy site, the method comprising:

storing a clone of the copy of the volume at one or more of the production site, and a remote storage;

receiving an input/output (I/O) request sent to the production site for processing on the volume;

replicating the I/O request from the production site to the copy site for processing on the copy of the volume at the copy site;

applying the I/O request to the copy of the volume at the copy site and to the stored clone of the copy of the volume at the one or more of the production site, and the remote storage;

placing the copy of the volume in an image access mode at a requested point in time upon receiving a request to place the copy of the volume in the image access mode; and detaching, at the requested point in time, the clone of the copy of the volume at the one or more of the production site and the remote storage from the copy of the volume.

2. The method of claim 1 further comprising:

determining a state of the clone of the copy of the volume at the one or more of the production site and the remote storage with respect to the copy of the volume;

if the clone of the copy of the volume at the one or more of the production site and the remote storage is in a sync state:

continuing to store I/Os; and if the clone of the copy of the volume at the one or more of the production site and the remote storage is in a syncing state:

updating dirty locations which differ between the clone of the copy of the volume at the one or more of the production site and the remote storage and the copy of the volume by copying data from the copy of the volume to the clone at the one or more of the production site and the remote storage and clearing a dirty bit in a differential bitmap; and updating a new I/O arriving to the copy of the volume to the clone of the copy of the volume at the one or more of the production site and the remote storage if the new I/O is to a synchronized area.

3. The method of claim 2 further comprising, if the clone of the copy of the volume at the one or more of the production site and the remote storage is in an error state, tracking changes arriving to the copy of the volume in a delta marking stream or in a bitmap to enable reattaching the clone of the copy of the volume at the one or more of the production site and the remote storage to the copy of the volume without a full sweep.

4. The method of claim 2 further comprising, if the clone of the copy of the volume at the one or more of the production site and the remote storage is in a detached state:

tracking changes occurring to the copy of the volume; and tracking changes occurring to the detached clone of the copy of the volume at the one or more of the production site and the remote storage.

5. The method of claim 4 wherein tracking changes occurring to the detached clone of the copy of the volume at the one or more of the production site and the remote storage comprises tracking changes in a facility provided by a storage array to track changes in a volume to enable reattaching the clone of the copy of the volume at the one or more of the production site and the remote storage to the copy of the volume without a full sweep.

6. The method of claim 4 wherein tracking changes occurring to the detached clone of the copy of the volume at the one or more of the production site and the remote storage comprises:

attaching the clone at the one or more of the production site and the remote storage to a splitter; and tracking changes in the splitter and a protection appliance.

7. The method of claim 2 further comprising:
if the clone of the copy of the volume at the one or more of the production site and the remote storage is in a detached state, accepting I/Os from a host; and
if the clone of the copy of the volume at the one or more of the production site and the remote storage is not in a detached state, accepting I/Os only from a data protection appliance maintaining the clone at the one or more of the more of the production site and the remote storage.

8. The method of claim 2 further comprising periodically attempting to recover the clone of the copy of the volume at the one or more of the production site and the remote storage if the clone of the copy of the volume at the one or more of the production site and the remote storage is in an error state.

9. The method of claim 1 further comprising:
reattaching the clone of the copy of the volume at the one or more of the production site and the remote storage to the copy of the volume;
merging differentials having occurred to the clone of the copy of the volume at the one or more of the production site and the remote storage with differentials having occurred to the copy of the volume;
adding the merged differentials to a bitmap indicating differentials between the clone of the copy of the volume at the one or more of the production site and the remote storage and the copy of the volume; and
moving the clone at the one or more of the production site and the remote storage to synching mode.

10. An apparatus comprising:
a processor; and
memory encoded with instructions that, when executed by the processor, cause the apparatus to perform data replication in a data replication environment comprising a volume at a production site and a copy of the volume at a copy site, comprising the operations of:
storing a clone of the copy of the volume at one or more of the production site, and a remote storage;
receiving an input/output (I/O) request sent to the production site for processing on the volume;
replicating the I/O request from the production site to the copy site for processing on the copy of the volume at the copy site;
applying the I/O request to the copy of the volume at the copy site and to the stored clone of the copy of the volume at the one or more of the production site, and the remote storage;
placing the copy of the volume in an image access mode at a requested point in time upon receiving a request to place the copy of the volume in the image access mode; and
detaching, at the requested point in time, the clone of the copy of the volume at the one or more of the production site and the remote storage from the copy of the volume.

11. The apparatus of claim 10 wherein the memory is further encoded with instructions that, when executed by the processor, cause the apparatus to perform the operations of:
determining a state of the clone of the copy of the volume at the one or more of the production site and the remote storage with respect to the copy of the volume;
if the clone of the copy of the volume at the one or more of the production site and the remote storage is in a sync state:
continuing to store I/Os; and
if the clone of the copy of the volume at the one or more of the production site and the remote storage is in a syncing state:
updating dirty locations which differ between the clone of the copy of the volume at the one or more of the production site and the remote storage and the copy of the volume by copying data from the copy of the volume to the clone at the one or more of the production site and the remote storage and clearing a dirty bit in a differential bitmap; and
updating a new I/O arriving to the copy of the volume to the clone of the copy of the volume at the one or more of the production site and the remote storage if the new I/O is to a synchronized area.

12. The apparatus of claim 11 wherein the memory is further encoded with instructions that, when executed by the processor, cause the apparatus to perform the operation of, if the clone of the copy of the volume at the one or more of the production site and the remote storage is in an error state, tracking changes arriving to the copy of the volume in a delta marking stream or in a bitmap to enable reattaching the clone of the copy of the volume at the one or more of the production site and the remote storage to the copy of the volume without a full sweep.

13. The apparatus of claim 11 wherein the memory is further encoded with instructions that, when executed by the processor, cause the apparatus to perform the operations of, if the clone of the copy of the volume at the one or more of the production site and the remote storage is in a detached state:
tracking changes occurring to the copy of the volume; and
tracking changes occurring to the detached clone of the copy of the volume at the one or more of the production site and the remote storage.

14. The apparatus of claim 13 wherein tracking changes occurring to the detached clone of the copy of the volume at the one or more of the production site and the remote storage comprises tracking changes in a facility provided by a storage array to track changes in a volume to enable reattaching the clone of the copy of the volume at the one or more of the production site and the remote storage to the copy of the volume without a full sweep.

15. The apparatus of claim 13 wherein tracking changes occurring to the detached clone of the copy of the volume at the one or more of the production site and the remote storage comprises:
attaching the clone at the one or more of the production site and the remote storage to a splitter; and
tracking changes in the splitter and a protection appliance.

16. The apparatus of claim 11 wherein the memory is further encoded with instructions that, when executed by the processor, cause the apparatus to perform the operations of:
if the clone of the copy of the volume at the one or more of the production site and the remote storage is in a detached state, accepting I/Os from a host; and
if the clone of the copy of the volume at the one or more of the production site and the remote storage is not in a detached state, accepting I/Os only from a data protection appliance maintaining the clone at the one or more of the production site and the remote storage.

17. The apparatus of claim 11 wherein the memory is further encoded with instructions that, when executed by the processor, cause the apparatus to perform the operation of periodically attempting to recover the clone of the copy of the volume at the one or more of the production site and the remote storage if the clone of the copy of the volume at the one or more of the production site and the remote storage is in an error state.

18. The apparatus of claim 10 wherein the memory is further encoded with instructions that, when executed by the processor, cause the apparatus to perform the operations of:
   reattaching the clone of the copy of the volume at the one or more of the production site and the remote storage to the copy of the volume;
   merging differentials having occurred to the clone of the copy of the volume at the one or more of the production site and the remote storage with differentials having occurred to the copy of the volume;
   adding the merged differentials to a bitmap indicating differentials between the clone of the copy of the volume at the one or more of the production site and the remote storage and the copy of the volume; and
   moving the clone at the one or more of the production site and the remote storage to synching mode.

19. A computer program product having a non-transitory computer readable storage medium with instructions encoded thereon that, when executed by a processor of a computer, causes the computer to perform data replication in a data replication environment comprising a volume at a production site and a copy of the volume at a copy site, comprising the operations of:
   storing a clone of the copy of the volume at one or more of the production site, and a remote storage;
   receiving an input/output (I/O) request sent to the production site for processing on the volume;
   replicating the I/O request from the production site to the copy site for processing on the copy of the volume at the copy site;
   applying the I/O request to the copy of the volume at the copy site and to the stored clone of the volume at the one or more of the production site, and the remote storage;
   placing the copy of the volume in an image access mode at a requested point in time upon receiving a request to place the copy of the volume in the image access mode; and
   detaching, at the requested point in time, the clone of the copy of the volume at the one or more of the production site and the remote storage from the copy of the volume.

20. The computer program product of claim 19 wherein the data replication further comprising:
   reattaching the clone of the copy of the volume at the one or more of the production site and the remote storage to the copy of the volume;
   merging differentials having occurred to the clone of the copy of the volume at the one or more of the production site and the remote storage with differentials having occurred to the copy of the volume;
   adding the merged differentials to a bitmap indicating differentials between the clone of the copy of the volume at the one or more of the production site and the remote storage and the copy of the volume; and
   moving the clone at the one or more of the production site and the remote storage to synching mode.

* * * * *